Nov. 27, 1951            K. W. KERN            2,576,881
TAIL GATE ELEVATOR LOADER FOR VEHICLES
Filed May 11, 1949            4 Sheets-Sheet 1
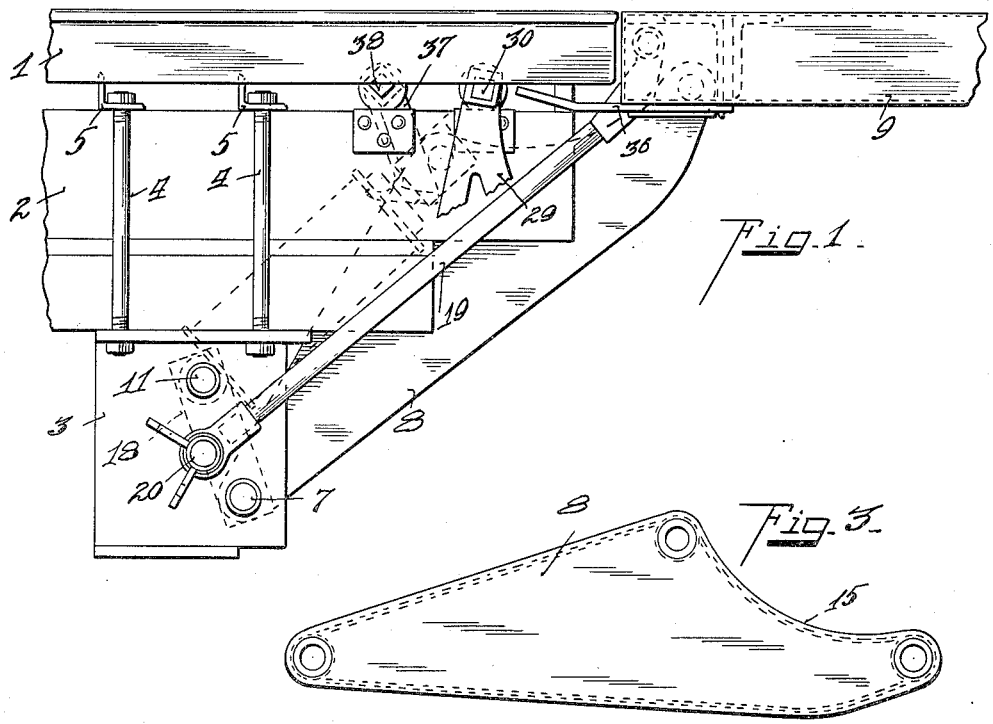
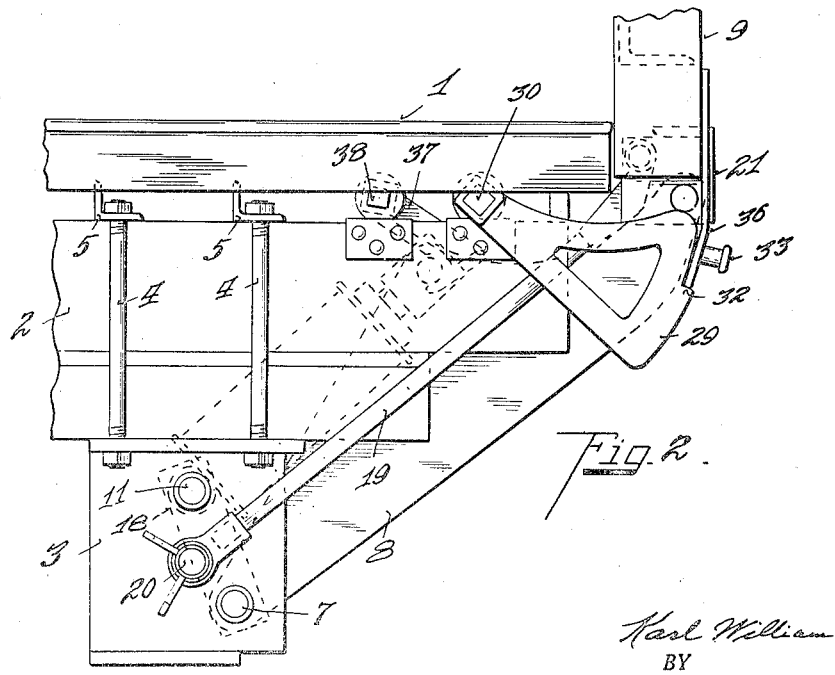
INVENTOR.
Karl William Kern
BY
Oliver B. Kaiser Atty.

Nov. 27, 1951 K. W. KERN 2,576,881
TAIL GATE ELEVATOR LOADER FOR VEHICLES
Filed May 11, 1949 4 Sheets-Sheet 2
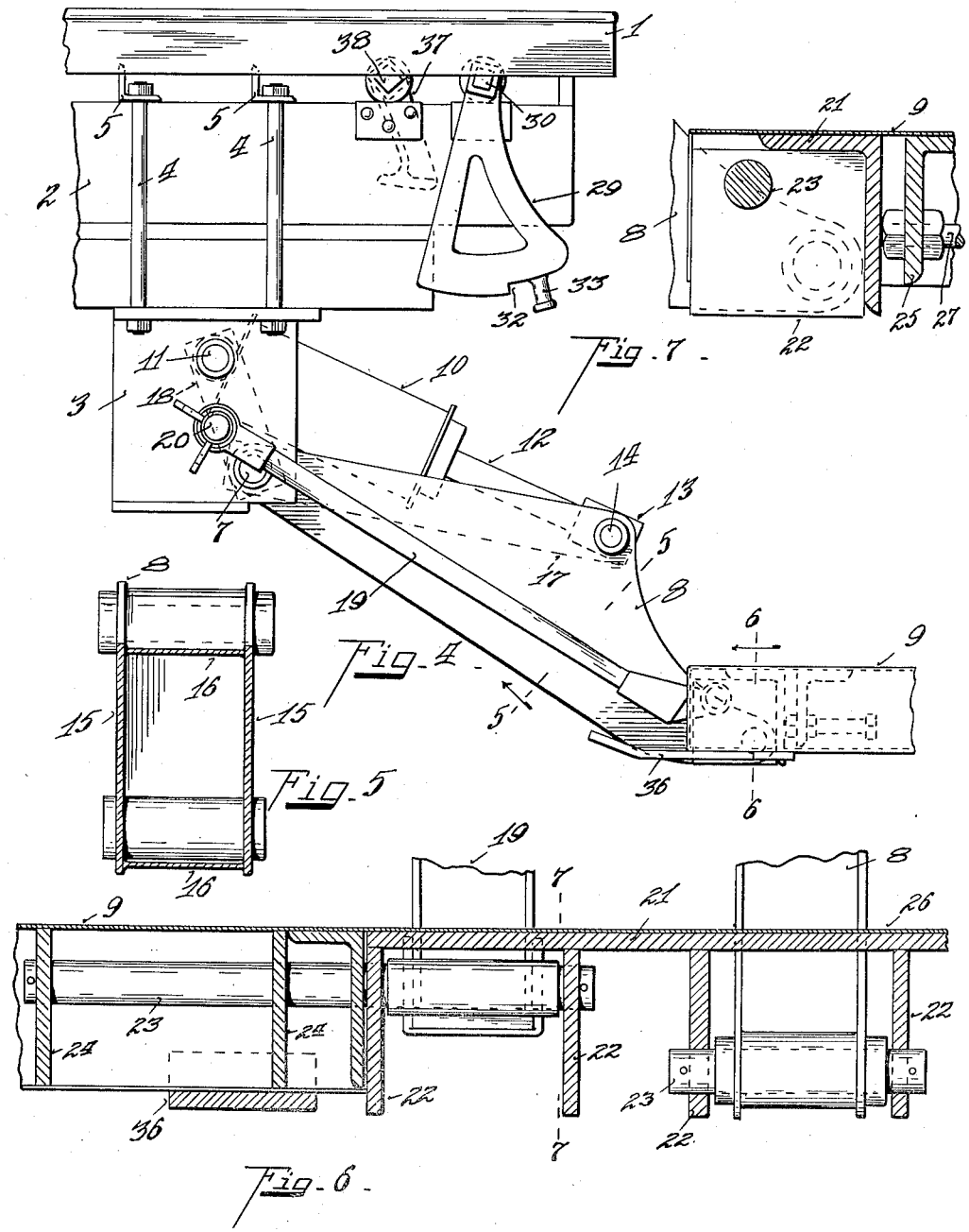
INVENTOR.
Karl William Kern
BY
Oliver B. Kaiser
atty.

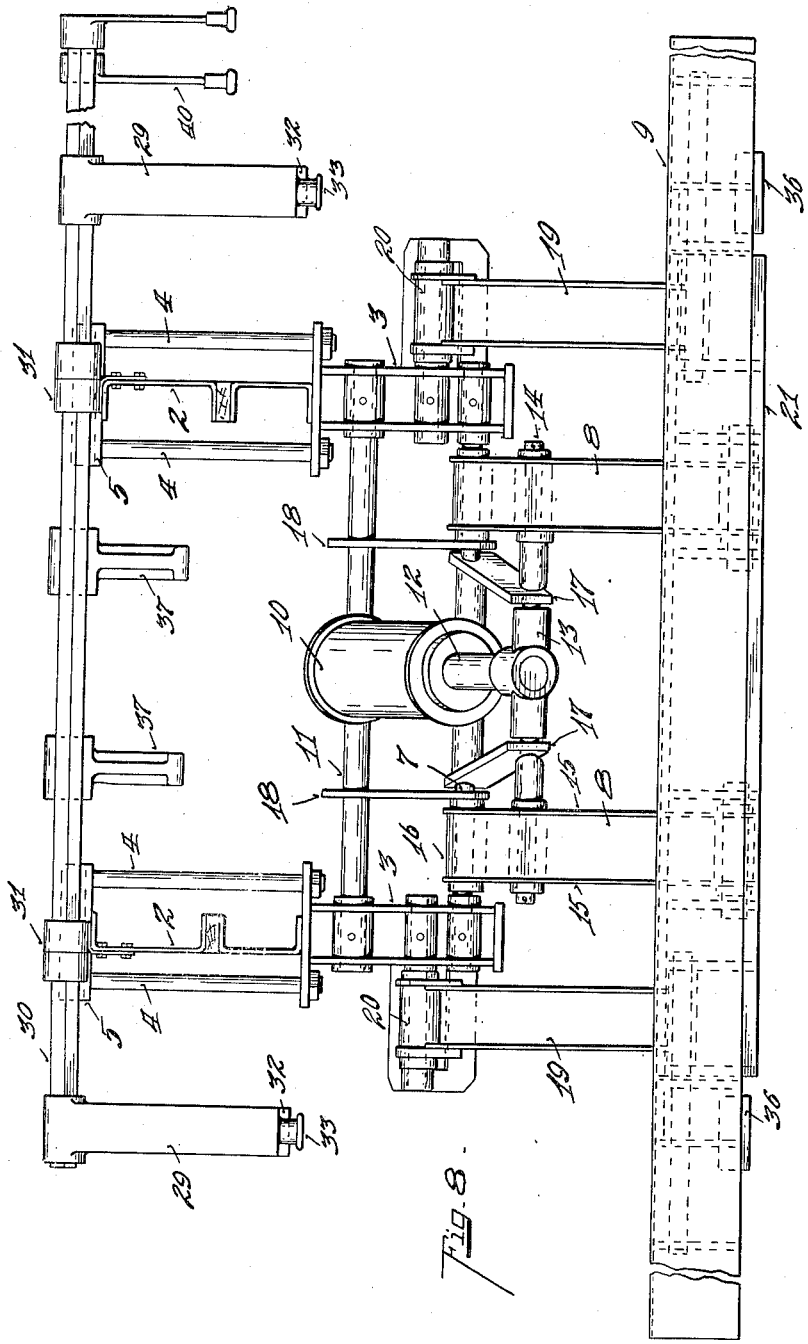

Nov. 27, 1951        K. W. KERN        2,576,881
TAIL GATE ELEVATOR LOADER FOR VEHICLES
Filed May 11, 1949        4 Sheets-Sheet 4
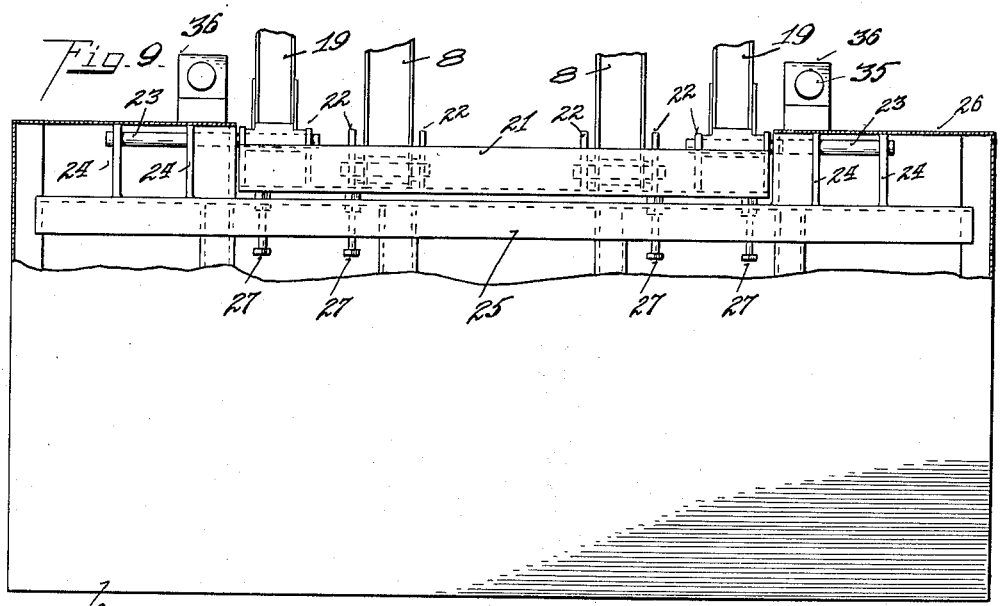
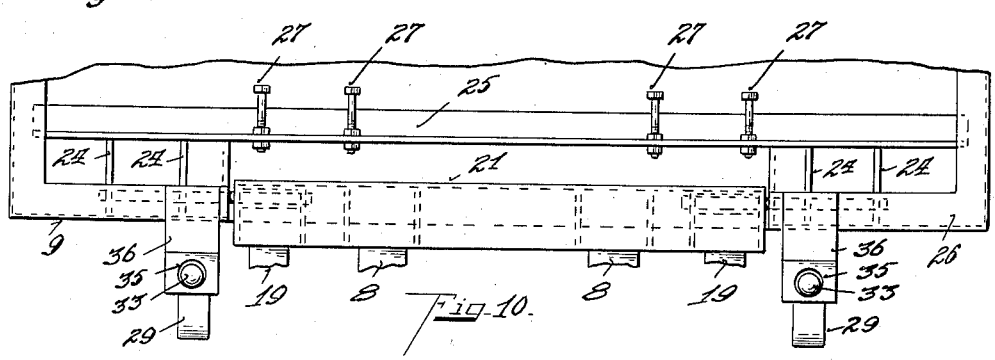
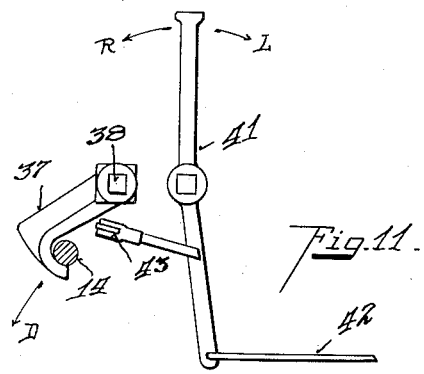
INVENTOR.
Karl William Kern
BY
Oliver B. Kaiser
Atty.

Patented Nov. 27, 1951

2,576,881

UNITED STATES PATENT OFFICE 2,576,881

TAIL GATE ELEVATOR LOADER FOR VEHICLES

Karl William Kern, Galion, Ohio, assignor to The Perfection Steel Body Company, Galion, Ohio, a corporation of Ohio Application May 11, 1949, Serial No. 92,676

2 Claims. (Cl. 214—77)

This invention relates to a power operated vehicle body tail gate and cargo elevator platform adapted to be positioned in either a vertical or horizontal plane, in the vertical plane to provide a closure for the rear end of the vehicle body and in a horizontal plane to hoist and lower cargo to and from a ground level and the plane of the vehicle body platform, as a loading and unloading facility.

An object of the invention is to provide a power driven apparatus for sustaining and translating a platform for cargo elevator carriage and as closure for the rear end of the vehicle body, of compact and unitary construction for ready application and securely mounting the same upon the conventional vehicle chassis or framework of different sizes and structure and beneath the vehicle body, the apparatus embodying a hydraulic or power driven unit in direct connection with lifting levers connecting the platform to the vehicle chassis or framework for translating the platform in a horizontal plane to elevate and lower cargo to and from a ground level and in plane with the vehicle body platform and from a horizontal plane to a vertical plane within the platform cargo elevating limits for closing the rear end of the vehicle body as a tail gate.

Another object is to provide a latch for locking the platform elevating or translating mechanism against movement when the platform is in a horizontal extended position from the vehicle platform or in a vertical position as a closure for the rear end of the vehicle body to the relief of the power unit for translating the platform and the power for driving the same.

Another object is to provide a plurality of arms pivoted at one end on supports attached to the vehicle frame beneath the load carrying platform or body of the vehicle and at their opposite end to a cargo elevator platform which in its elevated position is in plane with the vehicle body platform, at least two of the arms in an adjoining relation are directly connected to a piston of a hydraulic unit, the cylinder of which is also pivotally connected to the supports to which an end of the arms pivotally connects, thereby providing a method of assembly more economical of energy in lifting a given weight on the cargo elevator platform and reduction in degree or length of piston stroke for translating the cargo elevator platform from a ground level to the plane of the vehicle body platform, than by methods heretofore employed.

Another object is to provide a pair of hanger journal brackets for independent attachment and adjustment upon a vehicle frame one on each side of the frame, for pivotally connecting an end of a pair of levers, the levers at their opposite end each connected to the cargo elevator platform and a cylinder of a hydraulic unit disposed intermediate of said pair of levers and pivotally connected to the journal brackets at a point above the pivotal axes of the levers and having its piston connected to both levers at a point intermediate of and offset upwardly from a line diametric of the axes of the pivotal connections of the levers to the brackets and elevator platform, to also provide more economy of energy in lifting a given weight.

Various other objects and advantages of the invention are more fully set forth in and apparent from the following description of the preferred embodiment as illustrated by the drawings accompanied herewith and forming a part of the specification, in which:

Figure 1 is a side elevation of the rear end of a vehicle body and power operated tail gate when functioning as a cargo lift, and in a horizontal position level with the base of bottom of the vehicle body.

Figure 2 is a side elevation, similar to Figure 1 with the tail gate in a vertical position, as a closure for the rear end of the vehicle body.

Figure 3 is a side elevation of one of a pair of the gate elevating levers.

Figure 4 is a side elevation similar to Figure 1, with the gate in its lowered ground bearing position.

Figure 5 is an enlarged section on line 5, 5, Figure 4, through one of the gate elevating levers.

Figure 6 is an enlarged section on line 6, 6, Figure 4, partially of the width of the tail gate or platform, including one of the elevating levers and a relative link which cooperate to sustain the gate in a horizontal plane for its load carrying distance of travel.

Figure 7 is a section on line 7, 7, Figure 6.

Figure 8 is a rear elevation of the gate and hoisting mechanism with the gate in its ground bearing position as illustrated in Figure 4.

Figure 9 is a top plan view of the gate, with the deck or floor for the forward end thereof broken away to expose the interior to illustrate in plan the lever and link connection therewith.

Figure 10 is a rear elevation of the hinged end portion of the gate with the gate in a vertical position, as a closure for the rear open end of the vehicle body.

Figure 11 is a side elevation illustrating the means for latching the lifting levers in coupling connection with a power control lever.

Referring to the drawings 1 indicates the rear end of a platform of a vehicle body and may be of a type provided with removable panels for the opposite longitudinal sides and forward end of the body to give it a box form or substituted by stakes for confining the cargo carried upon the platform and therefore have not been included. The platform generally has a plurality of bolsters cross-wise thereof which are disposed and secured upon a pair of sills 2, 2, extending longitudinally of the vehicle body. As herein disclosed each sill comprises a pair of superposed rails of channel form in cross-section, rigidly secured together and combined as a unit, and of conventional construction whereby the upper rail may constitute a part of the platform framework, while the lower rail a part of the framework of the running gear, and therefore in detail are sufficient to illustrate the application of the structure of the present invention thereto.

Each sill 2 carries a depending journal hanger or bracket 3, bolted thereto by a plurality of bolts 4, arranged in pairs to overlie relative opposite side of and straddle the sill. One end of each pair of bolts connects with an angle shaped bar 5, extending transversely across and bearing upon the top or upper side of the sill and the opposite or lower end of the bolts traverse and connect with a head plate of the journal hanger bracket 3 for adjustably and securely clamping the journal hanger or bracket to the sill. As it is recognized that the commercial vehicles available to which the gate elevating mechanism may be applied are of different sizes and the sills not of uniform spacing apart, with the hangers as relatively independent of each other and not unitarily joined they can be readily independently set and adjusted upon the respective sills for ready application of the gate elevating mechanism and its power operating means as a unit to a variety of trucks or vehicle differing in size and frame spacing. The hanger construction and method of mounting is of simple and sturdy design capable of sustaining heavy loads to which the gate may be subjected in service.

Each hanger 3, provides three journal bearings in relative superposed arrangement, the lowermost thereof supporting and journalling a cross shaft or rod 7, which traverses and supports an end of a pair of gate elevating or lifting levers 8, 8, of duplicate construction. The end of the levers 8, 8, in their position upon the rod 7, each respectively adjoins a relative hanger 3 and at the inner side thereof thereby suitably spacing and disposing the same in a balanced condition at opposite sides of a hydraulic unit also carried by the hanger 3, for actuating the levers. The opposite end of each of the levers 8, 8, are correspondingly pivotally indirectly hinged with the end of a tail gate 9.

The hydraulic unit, as of conventional construction, is composed of a cylinder 10, having a head end pivotally mounted upon a rod 11, which has its opposite ends respectively mounted in the journal hangers 3, and located at an elevation above the bearing of a cross rod 7 carrying the gate lifting levers 8, 8. The cylinder 10 is provided with a piston or plunger having a rod 12 traversing the forward head of the cylinder and socketed within and connected to a cross-head 13, pivotally mounted upon a cross rod 14 and centrally of its length. The cross rod 14 at its opposite ends respectively connects with the gate lifting levers intermediate of their length and offset from a diametric line through the axes of the fulcrums connecting the opposite ends of the levers with the hangers 3 and tail gate 9.

The lifting levers 8, 8, are of duplicate construction, each as illustrated in detail in Figures 3 and 5, comprises a pair of spaced side plates 15, 15, somewhat of triangular outline, bonded together by a web 16 following the outline configuration of side plates and sleeves as bearings for the rods connecting with the levers, extending transversely of the side plates, one at each of the opposite longitudinal ends of the lever and a third intermediate of the length thereof and offset from the sleeves at the opposite ends of the lever. The structure provides a lever of marked stability capable of sustaining heavy loads without yield or flex and for making a direct power connection therewith to administer the full gate movement with a reduced degree of stroke movement of the ram or piston to the relief in degree of hydraulic pressure which otherwise would be required.

The cross rod 7 which hingedly connects the lifting levers 8, 8, to the hangers 3 and the cross rod 14 which connects the hydraulic unit to the lifting levers are connected by a pair of relatively angularly disposed links 17, 17, respectively at opposite sides of the hydraulic unit. Correspondingly the cross rods 7 and 11 are connected by a pair of parallel links 18, 18. Both sets of links serve to stabilize the rods intermediate of their length and the hangers.

A pair of links 19, 19, termed as guide links, of duplicate construction and dimension, each respectively at one end is journaled upon a stub shaft 20, supported in a relative hanger 3. The guide links 19, 19, are at the outer sides of the hangers and the opposite end of each thereof is pivotally connected to the hinged end of the tail gate 9, with their pivotal axis located above and forward from that of the lifting levers in their connection to the hinged end of the tail gate, and which arrangement correspondingly follows for the lifting levers and guide links sustained by the hangers 3. The longitudinal distance of a lifting lever and guide link, as a set, between their axes connections with a hanger and tail gate is equal, so that their relationship assumes that of a parallelogram.

The ends of the lifting levers 8, 8, and guide links 19, 19, connecting with the tail gate 9, as shown in Figures 6, 9 and 10, are each independently pivotally mounted upon a cross rail 21, preferably of angle iron form in cross section, having a plurality of pairs of laterally extending bracket plates 22, welded thereto, a pair respectively for each lifting lever and guide link. The hub end of each lifting lever and guide link respectively is engaged between a pair of bracket plates and pivotally connected thereto by a journal pin or rod 23, traversing the pair of bracket plates. The journal rods 23 for the guide links, each is of extended length and traverse a series of bracket plates 24, extending laterally from a cross-rail 25, as an element of the frame structure of the tail gate or cargo-carrying platform for hingedly connecting the gate to the cross or head rail 21.

The gate, as represented herein, is constructed entirely of metal and in general comprises a frame constructed of channel or other types of rails with the top and sides covered by a sheet metal casing 26, with the margins thereof extending inward for the bottom side of the gate. The hinged end is open slightly in excess of the length of the cross rail 21, which journals an end of each of the lifting levers and guide links, as a clearance therefor. This permits recessing the cross rail within the hinged end of the gate, so that when the gate is elevated to a position flush with the vehicle platform it is in intimate relation with the end of the platform, thereby avoiding any undue size of crevice or space therebetween.

The parallellogram arrangement of each lifting lever with a guide link, due to their relative off-set pivotal connections, at one end with a hanger attached to the frame and at the opposite end with the cross rail or head 21, stabilizes the cross-rail from any independent rotative action for the entire arc of movement of the levers and links. The tail gate in its horizontal load carrying plane is in bearing engagement with the cross-rail 21, by means of a plurality of bolts 27 carried by and extending transversely of the cross rail 25, so that the stud end of each of the bolts normally are in abutting contact with the cross rail 21. The cross-rail 25 as an element of the gate frame structure when the gate is disposed in a horizontal plane, lies in adjoining parallelism with the cross-rail 21 and may be regarded as in direct connection therewith and with the lifting levers and guide links and thereby resistant to any independent downward swing of the gate, but which however is free to swing independently upwardly to a vertical position as a closure for the rear end of the vehicle body. The cross-rail 25, as the cross rail 21, is of angle bar form and thus resistant to bend or flex and with the bolts 27 in abutting contact with the cross-rail 21 intermediate of the length thereof, the fulcrum connection of the gate to the cross rail is relieved from carrying the full load weight of the platform, and the bolts 27 can be adjusted to take up any sag of the platform from its horizontal plane.

The gate structure being such to sustain heavy cargo loads, its weight would make it burdensome to manually shift or swing the same from its horizontal plane to a vertical vehicle body closure position, therefore arrangement is made to operate the same by the power means employed for elevating the gate.

A pair of cam levers 29, 29, respectively at the outer sides of the sills 2 of the vehicle frame or running gear, are mounted upon a rod 30, extending cross-wise of the vehicle frame traversing and sustained in journal bearings 31, 31, respectively fixed to and upon the upper side of a relative sill 2. The cam levers 29 are of companion construction and approximately of sector outline with the outer arc end or edge of step form to provide an intervening shoulder 32. A headed pin or stud 33, extends radially from the arc edge of the cam lever, forward from the shoulder 32. The rod 30 at one end has a hand-hold lever fixed thereon for manually actuating the rod and cam levers.

The stud 33 of the cam levers provide for making a coupling connection with the hinged end of the gate upon engaging the studs, each respectively through an aperture 35, in the inclined end of a relative tongue 36, projecting longitudinally from the hinged end of the gate and to which it is rigidly fixed. The coupling or interlocking connection of the cam levers and projecting tongues of the gate is made at a midpoint in the upward travel of the gate between the platform and ground levels of travel and while the gate is in a horizontal plane, by manually swinging the cam levers forward to intersect the studs thereof with and through the apertures 35, which are of a diameter larger than the heads of the studs, and when effected brings the forward end of each tongue 36 into abutting engagement with the shoulder 32 of a relative cam lever thereby coupling the parts together. The gate thence in its continued upward travel is swung or rotated about its hinged connection with the cross rail 21 from a horizontal position to a final vertical position at the upward limit of movement of the gate elevating mechanism, as shown in Figure 2.

The gate in its descending travel is automatically uncoupled from the cam levers after the gate is again sustained in a horizontal plane by the engagement of the bolts 27 with the cross rail 21, which permits the studs 33 of the cam levers to be released and snap out of their engagement with the tongues 36.

The gate can be locked in its elevated position, either horizontally or vertically, by a pair of latch arms 37, 37, respectively disposed at relative opposite sides of the cylinder of the hydraulic unit and are mounted upon a cross rod 38, journaled in bearings respectively fixed upon the upper side of a relative sill 2 of the vehicle frame. The rod 38 at one end has a hand lever 40 fixed thereon for manually actuating the rod and latch arms. The latch arms 37 in the elevated position of the gate can be swung to engage their hook shaped ends with the cross rod 14 connecting the cross head 13 of the hydraulically operated plunger to the gate lifting levers. This latches the gate lifting levers to the vehicle body frame to the relief of the hydraulic unit, so that the fluid pressure to the cylinder can be cut off.

The hydraulic unit being of conventional type can be controlled to hold the gate at any intermediate point of its travel and in either direction of travel and as units of such type are also equipped with automatic stop or bypass arrangements the gate will stop automatically at its two limits of travel and which together with the fluid pressure control means for the cylinder, not being a part of the present invention are therefore not disclosed.

When the gate is in its vertical closed position it must be lowered to a midway point between the vehicle platform and ground level to swing the gate to a horizontal plane before disconnection of the cam levers 29, 29, from their coupling connection with the tongues 36, is effected. If it is desired to position the gate upon a ground level, its downward travel can be continued, as it is not necessary to stop its downward travel for uncoupling the cam levers from the tongues. If however it is desired to position the gate in plane with the vehicle body platform it is necessary to lower the gate a sufficient distance to swing the same to a horizontal plane whereupon the cam levers will automatically uncouple from the gate and upon a reverse of the control of the hydraulic unit for upward travel of the gate it is positioned in plane with the vehicle body platform. While the cam levers will automatically release themselves from the tongues, they can also be subjected to spring pressure to forcibly return and hold the same in their normal position out of the path of the tongues and are required to be held in their active position until coupled with the tongues.

The hydraulic unit being pivotally mounted upon the journal hangers or brackets 3, 3, adapts it to be in direct connection with the lifting levers, intermediate thereof and thus combines with the lifting levers to sustain the gate carrying load, thereby providing a method more economical of lifting a given weight than possible in the methods heretofore employed, as well as accommodating for a material reduction in the length of plunger stroke. The plunger of the hydraulic unit connecting with the lifting levers in an offset and elevated relation from a line through the axes of the levers connecting the opposite ends thereof respectively with the journal hangers and the gate, when the gate is in its lowermost or ground level position a leverage action is instituted combining the hydraulic unit and lifting levers for sustaining the gate carrying load so that the gate can be elevated at a reduced pressure for piston movement than would be otherwise necessary.

The structure of the lifting levers avoids any lateral flex thereof and as the shafts or rods which join the hydraulic unit to the lifting levers and their respective pivotal connections with the journal hangers are link connected, they are sustained against flex.

As the gate can be locked in an elevated position in plane with the vehicle body platform it can be utilized as an extension for the platform for increasing the capacity of the vehicle body and does not require the hydraulic unit to sustain the same in such position.

It is conventional in the constructions of trucks that the cargo carrying body primarily constitutes a platform upon which side and opposite end panels are removably mounted to give it a box form, or removable stakes substituted for the panels. For such types the elevator platform need only function as a translatable section of the main platform upon which side panels and an end panel or stakes may be removably mounted eliminating the necessity of swinging the elevator platform section to a vertical position as a tail gate so that the cam levers 29 may be dispensed with.

It is obvious that various methods may be employed for the power control as it is a common practice in a hydraulic unit to include a pump for supplying the fluid under pressure to the cylinder for reciprocating the plunger therein and to control the pump or the transmission operating the pump.

As shown in Figure 11, provision is made to delatch the latch arms 37, 37, from their locking connection with the cross rod 38 which connects the plunger with the lifting levers by a power control lever 41. The lever 41 is fixed upon an end of a cross shaft which carries one or a pair of depending arms, one of which connects with the end of a rod 42 leading to the pump of the hydraulic unit. The depending arm or arms of the lever 41 carrying a cross bar 43, adapted for engagement with the latch arms or hooks 37, 37 to shift the same from their latching connection with the cross head rod 38. Thus when the gate or platform 9 is latched in its elevated position either for body tail gate closure or in plane with the body platform, by momentary movement of the control lever 41 from its intermediate neutral position in a direction indicated by R to raise the cross head rod 14 off from the latching hooks 37, 37, then moving the control lever 41 to its lowering control position L, the cross bar 43 will then be brought into engagement with and move the latching hooks 37, 37 out of the path of the descending cross head rod 14 and the gate or platform will lower normally.

Having described my invention, I claim:

1. A device for hoisting merchandise to and from a plane with the body platform of a vehicle and a level therebeneath, comprising an elevator platform, a cross-head extending transversely of and to which at its opposite ends the elevator platform hingedly connects and longitudinally in bearing contact with the elevator platform to sustain the same in a horizontal plane and from which the elevator platform can be swung in an arc to a vertical position to provide a tail gate for the rear open end of the vehicle body, supports secured to and depending from the frame structure of the vehicle beneath its body platform, a pair of companion levers one of the ends of each pivotally connected to said cross-head and the other ends pivotally mounted on said supports, a pair of companion links one of the ends each pivotally connected to said cross-head eccentric to the pivot points of said levers and the other ends one of each pivotally connected to a support eccentric to the pivot points of said levers, a power unit connected to said supports and to said levers intermediate thereof for translating said elevator platform, a pair of levers pivotally mounted upon said frame structure of the vehicle adapted for making a coupling connection with said elevator platform to swing the same from a horizontal plane to and from a vertical position within the degree of elevator travel, and manually operated latch means mounted upon the frame structure of the vehicle for connecting the same to said first named levers to sustain the same against motion when the elevator platform is in an elevated position either horizontally or vertically to the relief of the power unit.

2. A device for hoisting merchandise to and from a plane with a body platform of a vehicle and a level therebeneath, comprising an elevator platform, a cross-head extending transversely of and connected to said elevator platform to sustain the same in a horizontal plane, supports secured to and depending from the frame structure of the vehicle beneath its body platform, a pair of companion levers one of the ends of each pivotally connected to said cross-head and the other ends pivotally mounted on said supports, each lever formed of a pair of spaced side plates of approximately triangular outline integrally joined by a web intermediate of and following the outline of the side plates, with the pivot points for the opposite ends of the lever respectively connecting the same to the cross-head and support in a diametric line parallel to the base of the triangle, a rod extending cross-wise of and connecting said levers, traversing the side plates of each thereof at the apex portion of the triangle, a pair of companion links one of the ends of each pivotally connected to said cross-head eccentric to the pivot points of said levers and the other ends one of each pivotally connected to a support eccentric to the pivot points of said levers, and a power unit for translating said elevator platform pivotally connected to said supports and to said rod connecting said levers.

KARL WILLIAM KERN.

REFERENCES CITED

The following references are of record in the file of this patent:

UNITED STATES PATENTS

| Number | Name | Date |
|---|---|---|
| 1,113,191 | Breese, Jr. | Oct. 13, 1914 |
| 2,348,993 | Novotney | May 16, 1944 |
| 2,389,221 | Wachter | Nov. 20, 1945 |
| 2,390,268 | Penney | Dec. 4, 1945 |
| 2,456,805 | Wohlforth | Dec. 21, 1948 |
| 2,469,321 | Wood | May 3, 1949 |
| 2,480,528 | Wachter | Aug. 30, 1949 |
| 2,525,424 | Novotney | Oct. 10, 1950 |